Nov. 5, 1940.  C. C. STRANGE  2,220,132
LOCKING MECHANISM
Filed May 22, 1939
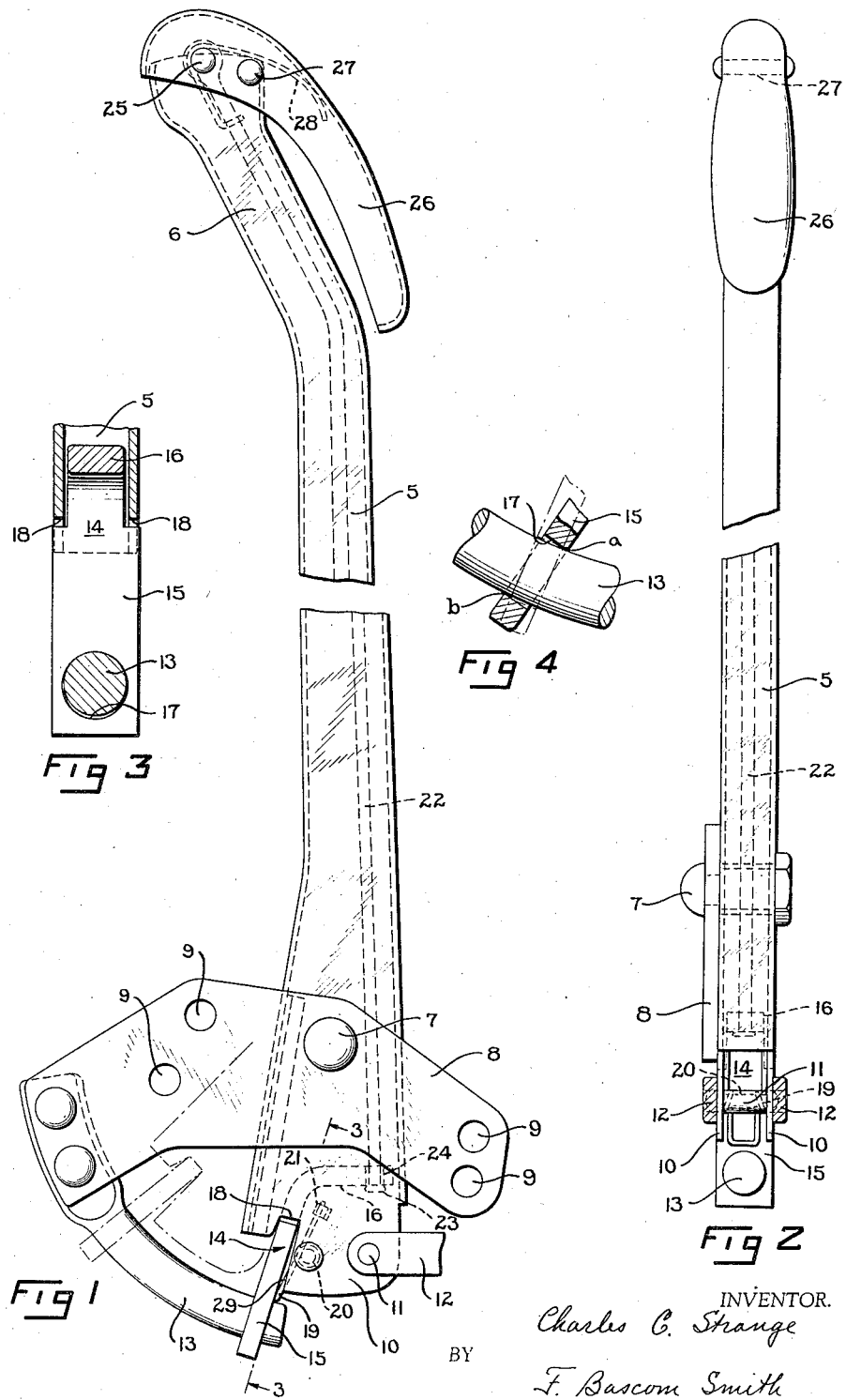
INVENTOR.
Charles C. Strange
BY F. Bascom Smith
ATTORNEY.

Patented Nov. 5, 1940

2,220,132

UNITED STATES PATENT OFFICE 2,220,132

LOCKING MECHANISM

Charles C. Strange, Port Richmond, Staten Island, N. Y.

Application May 22, 1939, Serial No. 274,902
In France April 11, 1939

7 Claims. (Cl. 74—531)

This invention relates to locking mechanism and more particularly to the combination therewith of control means for applying and releasing the same.

One of the objects of the present invention is to provide novel means for effecting and controlling the application and release of locking apparatus adapted for holding an element, such as a brake lever, against movement in at least one direction and for permitting a smooth release of said lever when desired.

Another object of the invention is to provide novel means in combination with friction locking means whereby the latter may be quickly and easily released when the operator applies a predetermined pressure to the former.

Still another object of the invention is to provide a locking mechanism having a novel locking member and novel means whereby the same is mounted and connected in operative position.

A further object is to provide a novel locking mechanism operable to hold a lever against movement in at least one direction, said mechanism being compactly constructed to occupy a minimum of space and having a minimum number of moving parts, whereby a positive and responsive operation of the mechanism is insured.

The above and further objects and novel features of the invention will more fully appear from the following detailed description when the same is read in connection with the accompanying drawing. It is to be expressly understood, however, that the drawing is for purposes of illustration only and is not intended as a definition of the limits of the invention, reference for this latter purpose being primarily had to the appended claims.

In the drawing, wherein like reference characters refer to like parts throughout the several views, Fig. 1 is a side elevation, with parts broken away, illustrating one form of the invention;

Fig. 2 is an elevation view, partly in section and with parts broken away, of the mechanism of Fig. 1;

Fig. 3 is a detail view, partly in section and with parts broken away, of a portion of the above mechanism, the section being taken along line 3—3 of Fig. 1; and, Fig. 4 is a detail view, partly in section and with parts broken away, illustrating two positions of the locking mechanism.

A single embodiment of the invention is illustrated in the drawing, by way of example, in a form adapted for use in applying and releasing the brakes of a vehicle. The locking mechanism employed for holding the brakes in applied position is of the friction gripping type and is so constructed as to permit application of the brakes to the fullest and exact extent desired and to hold the brakes in such applied position. Said mechanism is automatic in operation after movement thereof in brake applying direction and is so constituted that negligible, if any, back-lash is permitted when the brake applying force is released. A novel locking member is provided in combination with said mechanism and permits efficient operation of the latter in a relatively small space, the mounting of said member insuring a smooth release of the brakes when such release is effected by the vehicle operator. Novel means are associated with said locking mechanism whereby the latter may be readily released by the operator of the vehicle with the exertion of a comparatively slight force or effort.

In the illustrated embodiment of the invention, a hollow sheet-metal brake lever 5 provided with a handle 6 is pivoted intermediate its ends on a pivot pin or bolt 7 intermediate the ends of a bracket 8 which is, in turn, rigidly secured at a plurality of points 9 to a fixed part of a vehicle chassis (not shown). Bracket 8 is preferably mounted below the floorboards of the vehicle and lever 5 extends upwardly through said boards in the usual, well-known manner in a position to be readily grasped by the driver. The portion of lever 5 beneath said boards is preferably flared and arresting lugs or stops 10 are formed, for a purpose to be more fully described hereinafter, at the lower end of said lever, said stops being constituted by downward extensions of the side walls of said lever. By means of a pin 11, lever 5 is connected to a tension rod 12 which, in turn, may be connected to the vehicle brakes and is accordingly urged to the right, as viewed in Fig. 1, by the usual springs (not shown) employed for holding the brakes in released position. An arcuate rod or segment 13 constituting an element of the locking mechanism is rigidly mounted to one end of bracket 8 in a suitable manner, such as by having a flattened portion thereof bolted to said bracket, and said rod is preferably curved so that its center of curvature substantially coincides with pivotal axis 7 of lever 5.

It will be understood that, when lever 5 is moved in a clockwise direction, element 12 will be moved to the left, as viewed in the drawing, for applying the vehicle brakes. For the purpose of holding said lever or element, and hence the brake, in any desired applied position within the range of movement thereof, a locking member 14, which is adapted to cooperate with rod 13 and is novelly associated with lever 5, is provided. Said locking member, in the form shown, is constituted by a pair of comparatively flat metal arms 15 and 16 extending at an angle to each other, arm 15 having an opening 17 (Figs. 3 and 4) therein that is slightly larger than member 13 and that is adapted to slidably receive the latter. The diameters of opening 17 and rod 13 are such that when arm 15 is perpendicular to the axis of the rod, as seen in dotted lines in Fig. 4, said arm will be free for movement relative to the rod in either direction. However, when the locking plate is tilted in a clockwise direction, as shown in full lines in Fig. 4, the edges a and b of opening 17 tend to bite rod 13 and frictionally hold said locking plate against movement toward the right, as viewed in the drawing.

In order to render locking member 14 operative by operation of lever 5 and effective to hold element 12 against movement toward the right and hence to hold the brakes in applied position, a central portion of said member fits loosely in laterally disposed openings or slots 18 formed in the side walls at the lower end of lever 5, arm 16 thereof being of reduced width and extending into the interior of said lever. In order that member 14 may act as a bell crank and be pivoted or tilted, about the portion thereof in recess 18 as a fulcrum, into locking position relative to rod 13, arm 15 is wider than arm 16 (Fig. 3), the former being wide enough to engage the walls of said recess and said walls acting as a fulcrum about which the locking member pivots and said recess being large enough to permit this pivotal movement. It will be noted that this pivotal mounting of member 14 does not fix the axis of rotation of said member but permits the latter to have a limited radial or axial movement relative to rod 13 which is necessary in order to insure both a positive locking engagement and freedom of movement between arm 15 and rod 13. Suitable resilient means, such as a spring 19 wound on a pin 20 in stops 10 and having one end fixed to lever 5 at 21 and the other end bearing against the face of and tending to unwind in the direction of arm 15, is provided for normally holding the bell-crank locking element 14 in gripping engagement with element 13.

Novel means are provided whereby the locking member may be readily and easily moved to and manually held in released position, to thereby permit movement of the brakes to released position, said novel means in the form shown comprising a link 22, which may be either rigid or flexible, extending through hollow lever 5 and having one end thereof joined by a loose, one-way connection to the end of arm 16. The free end of link 22 is enlarged as at 23 and extends upwardly through an opening 24 in arm 16 and through lever 5 and handle 6. The upper end of rod 22 is pivotally secured by suitable means, such as a pin 25, to the end of a hand grip or lever 26, the latter being fulcrumed about a pivot 27 provided in the upper end of handle 6 and extending downwardly from said pivot in a parallel direction to said handle. A suitable spring 28 is provided to yieldingly hold lever 26 against pivotal movement in the direction of said handle and prevent the locking mechanism from being released inadvertently.

When handle 6 and grip 26 are grasped and, hence, squeezed together, the clockwise movement of said grip relative to the handle raises pin 25 and link 22 and the latter transmits the motion to member 14 which is turned in a counter-clockwise direction against the effort of spring 19 and releases the locking action between arm 15 and rod 13. Thus, the brake lever is rendered free for movement in either direction. In order to prevent bell crank 14 from being pivoted too far in a counter-clockwise direction during release and from being thereby locked against movement in the opposite direction, stop 10 is provided. The surface 29 of said stop is adapted to be engaged by arm 15 when the latter has been moved into released or non-locking position, i. e., when said arm is perpendicular to the axis of element 13.

When it is desired to apply the brakes and lock the same in applied position with the above-described mechanism, the operator grasps handle 6 and lever 26 and exerts a pull thereon to pivot lever 5 in a clockwise direction, as viewed in the drawing. Although it is preferable that lever 26 be operated to release the locking mechanism, as above described, the brakes may be initially or further applied without actuating the releasing mechanism, since movement of the lower end of lever 5 to the left tends to tilt arm 15 of locking member 14 into a perpendicular position relative to rod 13 and out of locking engagement with said rod. The movement of lever 5 in a clockwise direction moves element 11 to the left and applies the brakes to the desired extent, and when handle 6 and lever 26 are released, arm 15 immediately grips rod 13 and the pull exerted by element 12 in the direction of brake release only tends to tilt arm 15 further and causes the same to grip rod 13 more tightly. Accordingly, until lever 26 is pressed in the direction of handle 6 to thus pivot locking member 14 in a counter-clockwise direction, the brakes remain locked against release.

There is thus provided a novel locking mechanism adapted for operation in combination with a lever in order to automatically lock the latter against movement in at least one direction. The locking mechanism comprises a readily accessible releasing mechanism the latter being connected to the locking member through a minimum of moving parts, thereby assuring a positive releasing action. Said mechanism is further provided with novel means for limiting the movement of the locking member into releasing position, thus insuring a smooth release, and is novelly associated with an actuating lever.

Although only a single embodiment of the invention has been illustrated and described in detail, it is to be expressly understood that the same is not limited thereto but that various changes, particularly in the design and arrangement of parts illustrated, may be made therein without departing from the spirit and scope of the invention. Rod 13, for example, may have a rectangular or other desired cross-section instead of circular and the whole unit may be designed for mounting on the dash of a vehicle. For a definition of the limits of the invention, reference is primarily had to the appended claims.

What is claimed is:

1. In apparatus of the class described, a bracket, an arcuate rod depending from said bracket, a lever fulcrumed at the center of curvature of said rod upon said bracket and extending from said rod beyond the fulcrum, a recess being provided adjacent the end of said lever intermediate said fulcrum and said rod, a bell crank pivoted in said recess, one arm of said bell crank being adapted to frictionally engage said rod and lock said lever against pivotal movement in at least one direction, a link operatively associated with the other arm of said bell crank, and manually operable means mounted on the other end of said lever connected to said link, said last-named means being adapted to move said bell crank to non-locking position.

2. In apparatus of the class described, a bracket, an arcuate segment secured to said bracket, a lever pivotally mounted intermediate the ends thereof on said bracket, the lower end of said lever terminating within the arc of said segment and having a recess therein, a stop formed with and extending downwardly from the lower end of said lever, a bell crank pivotally mounted in said recess, one arm of said bell crank being adapted to frictionally grip said segment and lock said brake lever against movement in at least one direction, a link operatively associated with the end of the other arm of said bell crank, and means mounted upon the upper end of said lever and connected to said link, said last-named means being adapted for movement to release said bell crank from locking engagement with said segment, the movement of said bell crank in the direction of release being limited by said stop.

3. In a brake lever mechanism, the combination with a brake lever pivotally mounted intermediate the ends thereof and having a recess formed in one end thereof, of an arcuate stationary element, a locking member mounted in said recess for limited pivotal and radial movement relative to said element, said locking member comprising two arms angularly disposed relative to each other, one of said arms having an opening therein to receive said element and have locking engagement therewith, resilient means carried by said lever for normally holding said arm in locking engagement with said element, and means associated with the other arm of said locking member and adapted to be actuated for releasing said member from locking engagement with said element.

4. In apparatus of the class described, a bracket, an arcuate segment secured to said bracket, a pivoted lever fulcrumed on said bracket and having an end thereof terminating between said bracket and said segment, a locking member pivotally mounted in said end of the lever, resilient means for holding said member in gripping engagement with said segment, an arresting lug formed with said end of the lever, and means operatively connected to said member and adapted for moving the same into non-gripping position, the motion of said member by said last-named means being limited by said lug.

5. The combination with a bracket and a hollow lever, said lever being mounted intermediate the ends thereof on said bracket and having a recess in the lower end thereof, of a locking mechanism adapted to hold said lever against movement in at least one direction, said mechanism comprising an arcuate rod secured to said bracket, a locking member provided with an arm having an opening therein to slidably receive and frictionally grip said rod and with a second arm angularly disposed relative to said first-named arm and extending within the interior of said lever, said member having a portion extending into said recess for pivotal and radial movement relative to said rod, a link operatively connected with said second arm, and a member pivoted on the upper end of said lever and pivotally connected to said link, said member being adapted to apply a tension to said link and thereby release said first-named arm from gripping engagement with said rod.

6. The combination with a lever having a recess in the lower end thereof of a locking mechanism comprising a stationary arcuate rod, a member mounted in said recess for limited radial and pivotal movement, said member having an opening therein for slidably receiving said rod, resilient means carried by said lever for normally holding said member in gripping engagement with said rod, and a releasing mechanism comprising a pivotally mounted lever and a unitary link connecting said last-named lever with said member.

7. In apparatus of the class described, supporting means, an arcuate segment fixedly mounted on said supporting means, a pivoted lever mounted on said supporting means, one end of said lever terminating between the pivot for the lever and said segment, said pivot being substantially at the center of curvature of said segment, a locking element fulcrumed by said lever between said pivot and said segment and having two angularly disposed arms extending from the fulcrum point, one of said arms having an opening therein slightly larger than said segment for slidably receiving the latter, resilient means for normally tilting said element into locking engagement with said segment for holding said lever against pivotal movement in one direction, means mounted adjacent the other end of said lever and operatively associated with the other arm of said locking element for moving the latter about its fulcrum to non-locking position, and means movable with said lever for limiting the movement of said element by said last-named means.

CHARLES C. STRANGE.